United States Patent [19]

Züger

[11] Patent Number: 4,811,212

[45] Date of Patent: Mar. 7, 1989

[54] ADDRESS TRANSFORMATION CIRCUIT ARRANGEMENT

[75] Inventor: Stefan Züger, Baden, Switzerland

[73] Assignee: BBC Brown, Boveri & Company, Ltd., Baden, Switzerland

[21] Appl. No.: 915,025

[22] Filed: Oct. 3, 1986

[30] Foreign Application Priority Data

Oct. 18, 1985 [CH] Switzerland .................. 4493/85

[51] Int. Cl.$^4$ .................. G06F 12/06; G06F 12/10
[52] U.S. Cl. .................. 364/200
[58] Field of Search ... 364/200 MS File, 900 MS File

[56] References Cited

U.S. PATENT DOCUMENTS

| | | | |
|---|---|---|---|
| 3,813,652 | 5/1974 | Elmer et al. | 364/200 |
| 4,156,925 | 5/1979 | Tutt et al. | 364/200 |
| 4,279,014 | 7/1981 | Cassonnet et al. | 364/200 |

OTHER PUBLICATIONS

"Memory Addressing Scheme for Loosely Coupled Processors", Marton et al, IBM Tech Disc. Bull., vol. 22, No. 7, pp. 2883-2884 (Dec. 1979).

*Primary Examiner*—Thomas M. Heckler
*Assistant Examiner*—Joseph T. Fitzgerald
*Attorney, Agent, or Firm*—Burns, Doane, Swecker & Mathis

[57] ABSTRACT

Two circuit arrangements are described for transforming $2^n$ global addresses used in a control engineering system having several local units into $2^m$ local addresses used in one of the units of the system. One of these contains several memories in which subfunctions resulting from a splitting of the transformation function conveying the transformation are stored. The other circuit arrangement contains a single memory which accepts all subfunctions. The transformation function is split into the subfunctions in such a manner that an optimum compromise is achieved between the storage space required for storing the subfunctions and the time required for the transformation.

9 Claims, 2 Drawing Sheets

ADDRESS TRANSFORMATION CIRCUIT ARRANGEMENT

BACKGROUND OF THE INVENTION

The invention relates to a circuit arrangement for transforming present $2^n$ global addresses used in a control engineering system having several users into $2^m$ local addresses used in one of the local units of the system, comprising at least one memory.

In distributed control engineering systems having a plurality of units operating in accordance with the principle of source addressing, an individual unit, as a rule, is only utilizes a subset of the messages transmitted via the system. From the point of view of the individual unit, therefore, the source address space which comprises all addresses which are global for the control engineering system, are only very loosely occupied. To achieve an economic utilization of the communication memory required for communicating with the other units of the control engineering system in the individual user, a smaller space than the source address space is used for internal referencing and storing of the communication data. The consequence of this is that the source address space must be transformed into the internal address space of the individual unit. The transformation is determined by a separate transformation function of each individual unit. This function distinctly allocates to each global address of the source address space used by each unit a separate local internal address and to all other global addresses of the source address space not used by the unit a common local internal address. The transformation function is therefore a discrete function.

Prior systems calculate such discrete functions by means of a complete function table which is stored in a memory. This method is very fast because when the argument of the function, that is to say the global address, is applied to the address inputs of the memory, the desired local address immediately appears as associated function value at its data outputs. However, for a complete tabulation of the transformation function, a storage space of $N \lceil Log_2 \overline{M} \rceil$ bits is required where N designates the size of the source address space, M the size of the internal address space and the special brackets $\lceil \ \rceil$ are intended to indicate that the matter bracketed by them is to be rounded up to the next higher integral number. In a system typical of present-day applications and having $N = 2^{24}$ and $M = 2^8$, a storage requirement of $16,777,216 \times 8$ bits would be the result. To implement such a memory, for example with memory chips of $8K \times 8$ bits, which are inexpensive at present, more than 2000 memory chips would be required which means an outlay which is no longer practicable.

It is also known to store only the global addresses used by the individual unit, together with the local addresses associated with them, in a list stored in a memory. This solution requires the lowest memory capacity. In this solution, however, the list must be searched in each case by the user for transformation. In the individual case, this can take considerable time which limits the data rate which can be transmitted in the control engineering system in a manner which can no longer be tolerated for present-day requirements.

BRIEF SUMMARY OF THE INVENTION

The invention relates to a circuit arrangement of the type initially mentioned, which, on the one hand, manages with considerably less storage requirement than is necessary for complete tabulation of the transformation function and which, on the other hand, is capable of performing the transformation considerably faster than by searching a list containing only the global addresses used by the user.

As an example, with a source address space having a size of $N = 2^{24}$ and an internal address space having a size $M = 256$, the storage requirement of the circuit arrangement according to the present invention is less by more than 2000 times than in the known solution of the complete tabulation of the transformation function. In addition, the solutions according to the invention are faster by a factor of 20 to 100 than the solution of only carrying the global addresses used, together with their local addresses and of searching through this list.

BRIEF DESCRIPTION OF THE DRAWINGS

In the text which follows, one illustrative embodiment of two circuit arrangements according to the invention is explained in each case with the aid of the drawing, in which.

DETAILED DESCRIPTION OF THE PREFERRED EMBODIMENT

Figure 1:
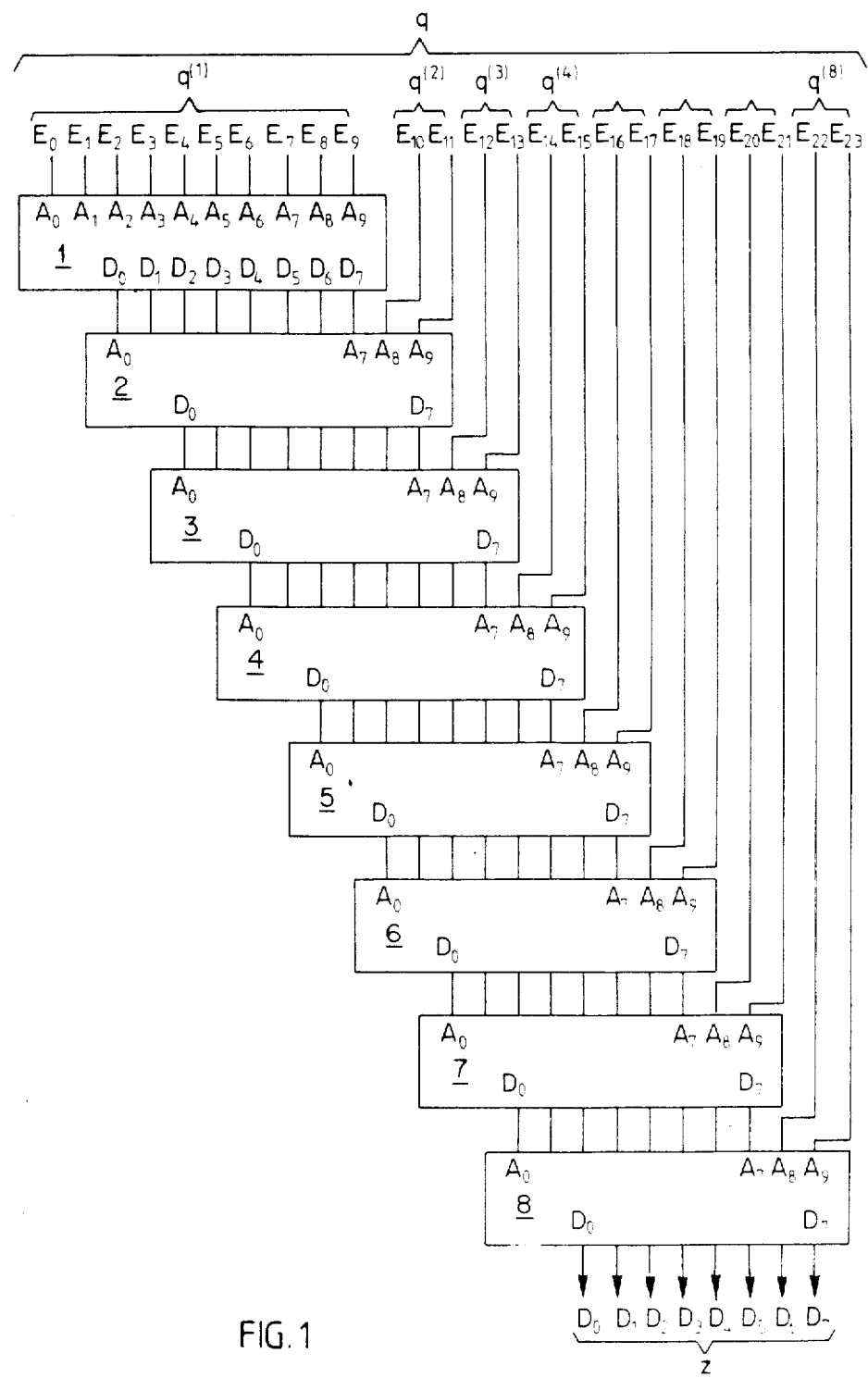
FIG. 1 shows a circuit arrangement having several memories for storing one subfunction in each case and FIG. 2 shows a circuit arrangement which contains only a single memory for storing the subfunctions.

Referring to FIG. 1, a plurality of memories designated by reference numerals 1 to 8 are shown each of which contains a subfunction, with the function values of the subfunction contained in memory 8 being the local addresses. Address inputs $A_0$ to $A_9$ of memory 1 are connected to the 10 least-significant bits $E_0$ to $E_9$, which by themselves form subaddress $q^{(1)}$, of the local address designated by q and consisting of the 24 bits $E_0$ to $E_{23}$. The 8 data outputs $D_0$ to $D_7$ of memory 1 are connected to first ones of address inputs $A_0$ to $A_9$ of memory 2, these being address inputs $A_0$ to $A_7$. The remaining second address inputs of address inputs $A_0$ to $A_9$ of memory 2, address inputs $A_8$ and $A_9$, are connected to the 2 bits $E_{10}$ and $E_{11}$, following in the sequence from lower-significance to higher-significance bits after subaddress $q^{(1)}$, of the global address q. These 2 bits $E_{10}$ and $E_{11}$ by themselves form subaddress $q^{(2)}$. In the same manner as memory 2 is connected to memory 1 and to subaddress $q(2)$, memory 3 is connected to memory 2 and a subaddress $q^{(3)}$, memory 4 is connected to memory 3 and to a subaddress $q^{(4)}$ and so forth, up to memory 8. Accordingly, the eight memories 1 to 8 are connected in series in such a manner that, apart from the memory 8 which is last in the sequence, in each case their data outputs $D_0$ to $D_7$ are connected to in each case the first address inputs $A_0$ to $A_7$ of a succeeding memory. At the second address inputs $A_8$ and $A_9$, memories 1 to 8 receive in each case two of the bits of the global address q. In general, the bits of the global address q are divided over the individual memories 1 to 8 in the following manner: if n designates the number of bits of the global address q, m the number of data outputs of the memories—by which at the same time also the number of bits of the local address z, which can be picked up at the data outputs of the last memory, is given—and k the number of memories, $s_1 = m + (n-m)/k$ bits are connected to the first memory of the series circuit and in each case $s_2 = s_3 = \ldots s_k = (n-m)/k$ bits of the global address q are connected to the other memories. In the example of FIG. 1, this rule is kept with $S^1=10$ and $s_2=s_3= \ldots =s_8=2$. In addition, the global address q is successively split into the subaddresses $q^{(j)}$ from the least significant to the most significant bits. Splitting the global address q into subaddresses $q^{(j)}$ can also be mathematically described, therefore, by $$p_j = \prod_{a=1}^{j} 2^{s_a} \text{ and } p_0 = 1,$$

where the $s_a$ have the meaning defined above. "mod" is the modulo function and "div" is the integral division. The value of $k=\frac{1}{2}(n-m)$ should be selected as an optimum value for the number k of memories. This rule is also kept with $k=8$ in the example of FIG. 1. The present dimensioning instructions result in a minimum storage requirement C which is $C=2(n-m)2^m$ m bits for all memories together.

Using the circuit arrangement described, the global address q is transformed into the local address z in eight—generally in k—steps, each step being one storage cycle. In the first step, the subaddress $q^{(1)}$ is used to select a storage space in memory 1, the content of which appears at its data outputs $D_0$ to $D_7$ and is thus simultaneously present at address inputs $A_0$ to $A_7$ of memory 2. In the second step, one of 2m storage areas with 4 storage cells—generally with $2(n-m)/k$ storage cells—is selected in memory 2 via the contents, determined in the first step, of the storage cell selected in memory 1 by subaddress $q^{(1)}$, and within the storage area selected, one of the 4 storage cells selected by subaddresses $q^{(2)}$, the content of which storage cell then appears at data outputs $D_0$ to $D_7$ of memory 2. Steps 3 to 8 are analogous to step 2. So that the desired local address z appears at the data outputs $D_0$ to $D_7$ of memory 8 at the eighth step, the subfunctions $w_j$ stored in memories 1 to 8 must have the following relationship to the transformation function w: $z=w(q)=wk(q(k), w_{k-1}(q^{(k-1)}), \ldots, w_1(q^{(1)}) \ldots ))$, where $q^{(j)}$ are the subaddresses of the global address q, as defined above. The function values of the subfunction $w_1$ to $w_7$, which are contained in memories 1 to 7 are graphically spoken pointers which point to storage areas in the succeeding memory following in each case. Subaddresses $q^{(j)}$ can also be interpreted as pointers which point to a quite specific storage cell in the storage areas selected by the function values of the subfunctions. In practice, the above points point a way to the correct local address z.

For each predefined transformation function, the values of the indivdiual subfunctions must be determined in such a manner that they meet the aforementioned condition. A method of determining these values which must be finally stored in memories 1 to 8, is specified in the text below.

I. All k memories must be cleared, that is to say all memory contents must be set to zero.

II. Beginning with a first one of the global addresses used by the user, for example the smallest of these addresses, this is split into subaddresses $q^{(1)}$ to $q^{(k)}$ as described above.

III. A check is made whether the storage cell determined by subaddress $q^{(1)}$ in memory 1 contains the value zero.
If yes, go to step IV,
If no, V step is executed.

IV: In memory 2, a storage area containing zero in all memory cells is searched for, beginning with the storage area having the second lowest address. The address of the first storage area found in this manner and only containing zeros is entered into the storage cell determined by subaddress $q^{(1)}$ in memory 1.

V: A check is made whether the storage cell determined by subaddress $q^{(2)}$ in memory 2 contains zero in the storage area determined by the contents of the storage cell considered at step III.
If yes, executed step VI,
If no, step VII is executed.

VI: In the succeeding memory, a storage area containing zero in all storage cells is searched for, beginning with the storage area having the second lowest address. The address of the first storage area found in this manner, and containing only zeros, is entered into the storage cell checked for its contents before execution of step VI in the preceding memory.

VII: A check is made whether the storage cell determined by subaddress $q^{(j)}$ in the following j-th memory contains zero in the storage area determined by the content of the storage cell, which was checked for its content before execution of step VII, in the preceding memory, and whether j is smaller than k.
If the content of the storage cell is zero and j is less than k, step VI is executed,
if the content of the storage cell is different from zero and j is less than k, step VII is executed,
if j is equal to k, the internal address belonging to the global address considered is entered into the storage cell concerned.

VIII: Steps II to VII of the method are carried out for all other global addresses used by the user.

By means of the method explained above, the global addresses not used by the user are automatically allocated the address zero as the local address common to these global addresses. Naturally, another address such as, for example, address 255 could also be used as common local address which then, however, would still have to be entered into all storage spaces containing zeros of the k-th memory.

Since the storage capacity of modern memory chips, as a rule, is sufficient for accommodating several of the k subfunction tables at the same time, in the example with $n=24$, $m=8$ and $k=8$ hitherto selected even all 8 subfunction tables, it will be frequently found to be a more favourable solution to use less than k memories, preferably even only a single memory. Such a circuit arrangement having only one memory will now be explained with the aid of FIG. 2.

All subfunction tables which, in the circuit arrangement according to FIG. 1, are stored in a respective one of the eight memories 1 to 8, are to be stored in successive memory zones in the one memory 10. Actually, the circuit arrangement according to FIG. 2 operates exactly in accordance with the same principle as the circuit arrangement according to FIG. 1. That is, the local address z is determined from the global address q in eight steps which are analogous to the eight steps explained in the description of the operation of the circuit arrangement according to FIG. 1. What has hitherto been discussed with respect to the subfunctions, the manner in which they are determined in real terms and the subaddresses also applies by analogy to the circuit arrangement according to FIG. 2. However, by using only one memory 10, it is necessary in the circuit arrangement according to FIG. 2 to temporarily to store the results of steps 1 to 7. This is done by means of a latchable temporary memory 11 which is connected between the data outputs $D_o'$ and $D_7'$ and first address inputs $A_o'$ to $A_7'$ of memory 10. In addition, at least a binary counter 12, another latchable temporary memory 13 and two—generally $(n-m)/k$—shift registers 14 and 15 are also required. To the input of temporary memory 13 bits $E_0$ to $E_7$, that is the n least significant bits of the global address q, are applied and the output, as also temporary memory 11, is connected to the first address inputs $A_0'$ to $A_7'$ of memory 10. The shift register 14 receives at its inputs all even bits, and the shift register 15 receives at its inputs all odd bits of the other $(n-m)$ bits of the global address q. The outputs 14.1 and 15.1 of the two shift registers 14 and 15 are connected to second address inputs $A_8'$ and $A_9'$ of memory 10. At third address inputs $A_{10}'$, $A_{11}'$, $A_{12}'$ of memory 10 the counting outputs 12.1, 12.2 and 12.3 of the binary counter 12 are connected. The binary counter must be capable of representing at least k different numbers, that is it must be at least a $\lceil Log_2 k \rceil$ bit counter. The circuit arrangement according to FIG. 2 also has a clock and control logic for controlling the aforementioned components. This logic consists of OR gates 16 and 17, and AND gate 18, NAND gate 19, NOR gates 20 and 21, inverters 22 and 23 and control lines 24 to 35. The input of the OR gate 16 is connected to the counting outputs 12.1, 12.2 and 12.3 of the binary counter 12. At the output, the control line 24 extends from the OR gate 16 to one of the inputs of the OR gate 17, to the inverter 22 and to one input 13.1 of the temporary memory 13. From the output of inverter 22, a branching control line leads to an input 13.2 of the temporary memory 13 and to an input 11.1 of the temporary memory 11. At the outputs of the OR gate 17, a branching control line 26 extending to inputs 14.2 and 15.2 of the shift registers 14 and 15 is connected. A control line 27 leads to an input 12.4, used as reset input, of the binary counter 12 and a control line 28 leads to a clock input 12.5 of this counter 12. In addition, the latter is connected to one of the inputs of the AND gate 18. A control line 29 is applied to a second input of this AND gate 18, which control line is connected to the output of the NAND gate 19 and which also extends via corresponding branchings to a loading input 12.6 of the binary counter 12 and to one of the inputs of the NOR gate 21. The second input of this gate 21 is connected via the NOR gate 20 and the control line 30 to the data outputs $D_0'$ to $D_7'$ of memory 10. From the output of the AND gate 18, the control line 31 extends via corresponding branchings in each case to clock inputs 11.2, 14.5 and 15.3 of the temporary memory 11 and of the shift registers 14 and 15 and to the input of the inverter 23. The output of the latter is connected via a control line 32 to a second input of the OR gate 10. Finally, it must still be mentioned that the input of the NAND gate 19 is connected via the control lines 33, 34 and 35 to the counting outputs 12.1, 12.2 and 12.3 of the binary counter 12 and the output of the NOR gate 21 is connected to a signal line 36.

Figure 2:
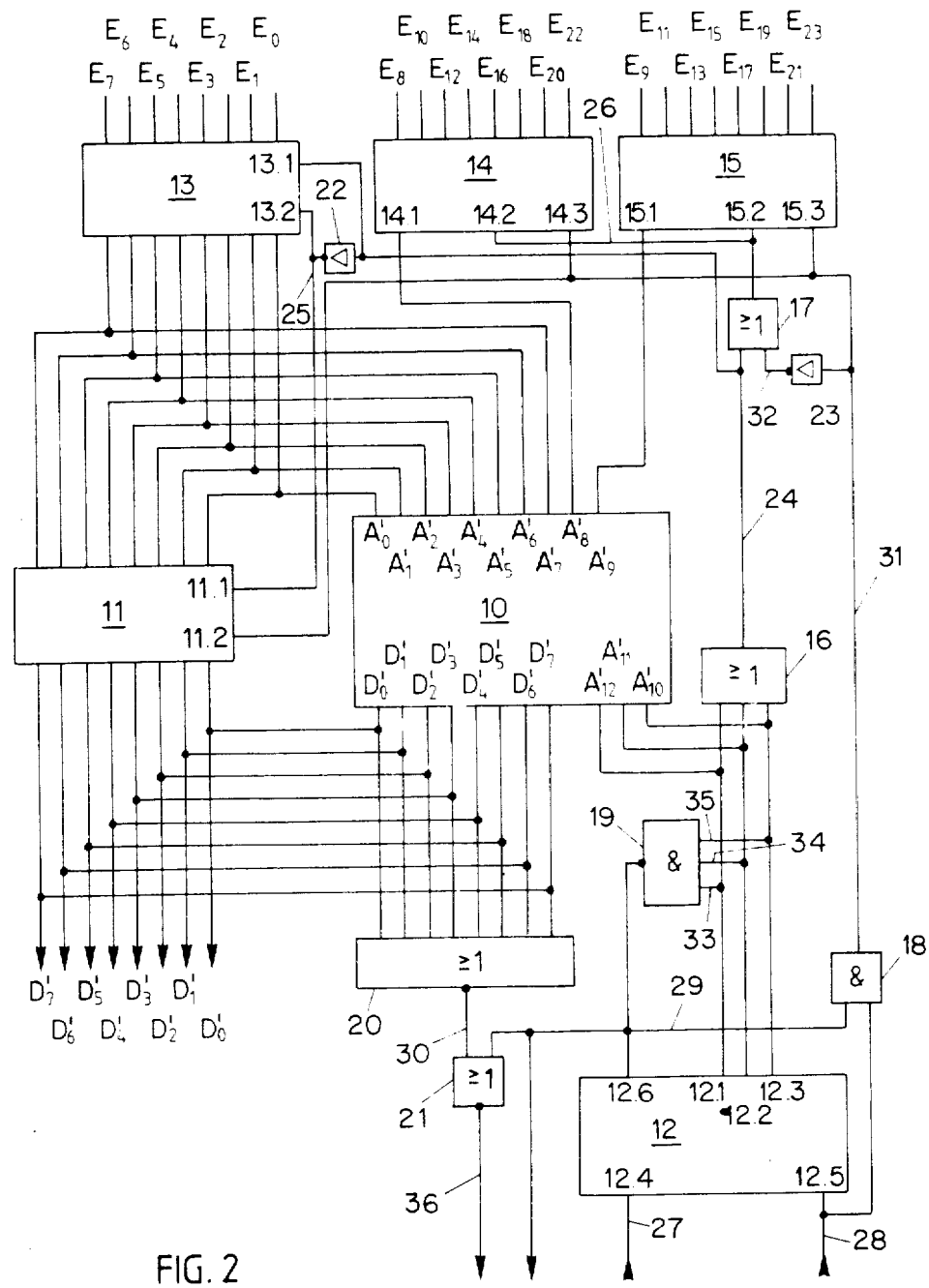

As already mentioned, a transformation is also carried out in eight—generally in k—steps in the circuit arrangement according to FIG. 2. The first step is initiated by the binary counter 12 being set to a count of zero which can be done, for example, by means of a pulse via the control line 27 to its reset input 11.4. The count of zero is converted by the OR gate 16 into, for example, a "low" signal level on the control line 24. This "low" signal level then causes bits $E_0$ to $E_7$ of the global address q to be transferred into the temporary memory 13 via the input 13.1 of the temporary memory 13. The "low" signal level, which also exists on the control line 26, also causes bits $E_8$ to $E_{12}$ to be transferred into shift registers 14 and 15 via the inputs 14.2 and 15.2 of the latter, the even-number bits being loaded into shift register 14 and the odd-number bits being loaded into shift register 15. Due to the fact that a "high" signal level, which is the inverse of the "low" signal level, is simultaneously present at input 13.2 of the temporary memory 13 via the inverter 22 and the control line 25, bits $E_0$ to $E_7$ are also switched through directly to its outputs and are present at the first address inputs $A_0'$ and $A_7'$ of memory 10. The temporary memory 13 is therefore unlatched at the output during the first step whilst the temporary memory 11, at the input 11.2 of which a "low" signal level is present during the first step, is latched at the output. At outputs 14.1 and 15.1 of the shift registers 14 and 15, bits $E_8$ and $E_9$ which are in each case the least significant bits in the sequence of loaded bits appear directly which are then also present at the second address inputs $A_8'$ and $A_9'$ of memory 10. As in the circuit arrangement according to FIG. 1, bits $E_0$ to $E_9$ form sub address $q^{(1)}$. Via address inputs $A_{10}'$, $A_{11}'$ and $A_{12}'$, at which, as assumed, zero should first be present and which are connected to the binary counter 12, a first storage zone in memory 10 is addressed which should contain the subfunction contained in memory 1 in the example of FIG. 1. Within this storage zone, the same storage cell is addressed via address inputs $A_0'$ to $A_9'$ as in memory 1 in the example of FIG. 1, the content of which appears as result of the first step at data outputs $D_0$ to $D_7$ of memory 10.

The second step is initiated by a clock pulse on control line 28 which, in addition to passing to clock input 12.5 of counter 12, also passes to inputs 11.2 of the temporary memory 11, 14.3 of the shift register 14 and 15.3 of the shift register 15 via the control line 31. At the binary counter 12, the clock causes an incrementing action as a result of which a second storage zone is addressed in memory 10 which should contain the subfunction which is contained in memory 2 in the example of FIG. 1. On the control lines 24 and 26, the signal level changes from "low" to "high" and, conversely, the signal level changes from "high" to "low" on control line 25. The result of this is that the shift registers 14 and 15 are switched via their inputs 14.2 and 15.2 from "loading" to "shifting", the output of the temporary memory 13 is latched via its input 13.2 and the temporary memory 11 is switched via its input 11.2 to be ready for accepting the result of the first step. This result is then also immediately switched through to the first address inputs $A_0'$ to $A_7'$ of memory 10. The contents of shift register 14 and 15 are shifted by the clock in each case by one position so that bits $E_{10}$ and $E_{11}$ appear at their outputs 14.1 and 15.1 which, together, form the subaddress $q^{(2)}$ as in the circuit arrangement according to FIG. 1. Via the bits now present at address inputs $A_0'$ to $A_9'$ of memory 10, a storage cell is selected within the storage zone address by binary counter 12, which storage cell corresponds to the storage cell in memory 2, selected in the second step in the circuit arrangement according to FIG. 1. As a result of the second step, its content appears at data outputs $D_0'$ to $D_7'$ of memory 10.

Steps 3 to 8 are analogous to the second step. at the end of the eighth step, the desired local address z appears at data outputs $D_0'$ to $D_7'$ of memory 10. Gates 18, 19, 20 and 21 are essentially used for establishing that the eighth step has been reached, for terminating the transformation operation and for signalling this on signal line 36 (and also on control line 29).

The principles, preferred embodiments and modes of operation of the present invention have been described in the foregoing specification. The invention which is intended to be protected herein, however, is not to be construed as being limited to the particular forms disclosed, since these are to be regarded as illustrative rather than restrictive. Variations and changes may be made by those skilled in the art without departing from the spirit of the invention.

What is claimed is:

1. A circuit arrangement for transforming $2^n$ n-bit global addresses used in a control engineering system having a plurality of local units into $2^m$ m-bit local addresses used in a respective one of the local units, comprising at least k serially-connected memories each having at least m first address inputs and at least $(m-n)/k$ second address inputs, and at least m data outputs, said memories being connected in a serial-sequence such that, apart from said last memory in the serial sequence, said data outputs for each memory are connected to said first address inputs of an immediately succeeding memory, and wherein $m+(n-m)/k$ bits of the global address are connected to a corresponding number of address inputs of the first memory in said serial sequence, wherein $(n-m)/k$ further bits of the global address are connected to said second address inputs of the remaining memories, wherein each memory contains discrete subfunctions $W_j$ obtained from splitting a transformation function W conveying the desired transformation in accordance with $w(q)=w_k(q^k), w_{k-1}(q^{(k-1)}, \ldots, w_1(q^{(1)}) \ldots ))$, where the $q^{(j)}$ are subaddresses of the global address q defined as $q^{(j)}=(q \bmod p_j) \operatorname{div} p_{j-1}$, where $$p_j = \prod_{a=1}^{j} 2^{s_a}$$

$p_0=1$
$s_1=(m+(n-m)/k)$,
$s_2=s_3=\ldots=S_k=(n-m)/k)$ and "mod" is the modulo function and "div" is the integral division, and wherein the function values of the subfunction contained in the final memory of said serial sequence are the local addresses.

2. A circuit arrangement according to claim 1, wherein $n>m$ and $k=\frac{1}{2}(n-m)$.

3. A circuit arrangement according to claim 1, wherein the $(m+(n-m)/k)$ bits of the global address, connected to said first memory of the k memories in the serial sequence, form the subaddress $q^{(1)}$ and the respective $(n-m)/k$ bits of the global address, connected to said second address inputs of the remaining memories, form the subaddresses $q^{(2)}$ to $q^{(k)}$.

4. A circuit arrangement for transforming $2^n$ n-bit global addresses used in a control engineering system having a plurality of local units into $2^m$ m-bit local addresses used in a respective one of the local units, comprising at least one memory, wherein at a first time m bits of said global address are connected to m first address inputs of the memory, wherein the $k-1$ further times, the binary states of m data outputs of said memory, which have been assumed by these outputs at the times preceding in each case, are fed back to the m first address inputs, wherein at all k times, $(n-m)/k$ further bits of the global address are applied to a respective $(n-m)/k$ second address inputs of said memory, wherein an at least $\lceil \log_2 k \rceil$ bit binary counter is provided which is connected to $\lceil \log_2 k \rceil$ third address inputs of the memory, wherein said memory contains in k storage zones discrete subfunctions obtained from splitting a transformation function conveying the desired transformation in accordance with $w(q)=w_k(q^k), w_{k-1}(q^{(k-1)}, \ldots, w_1(q^{(1)}) \ldots ))$, where the $q^{(j)}$ are subaddresses of the global address q defined as $q^{(j)}=(q \bmod p_j) \operatorname{div} p_{j-1}$, where $$p_j = \prod_{a=1}^{j} 2^{s_a}$$

$p_0=1$
$s_1=(m+(n-m)/k)$,
$s_2=s_3=\ldots=s_k=(n-m)/k)$ and "mod" is the modulo function and "div" is the integral division, wherein the k storage zones are successively addressed at k times by the binary counter through said third addresses inputs and wherein the function values of the subfunction in the storage zone last addresses are the local addresses.

5. A circuit arrangement according to claim 4, wherein $n>m$ and $k=\frac{1}{2}(m-m)$.

6. A circuit arrangement according to claim 4, wherein the total number of $m+(n-m)/k$ bits of the global address, present at said first and said second address inputs of said memory at the first time form subaddresses $q^{(1)}$ and the $(n-m)/k$ bits of the global address, present at the second address inputs at the subsequent $k-1$ times, form subaddresses $q^{(2)}$ to $q^{(k)}$.

7. A circuit arrangement according to claim 4, wherein said m bits of said global address are switched the first time by a first latchable temporary memory to said m first address inputs of said memory and wherein a second latchable temporary memory is connected between these m address inputs and the m data outputs and is latched at this time.

8. A circuit arrangement according to claim 7, wherein at the $k-1$ further times, the binary states of the m data outputs of the memory, which have been assumed by the latter at the times preceding in each case, are fed back through the second temporary memory to the m first address inputs and wherein the first temporary memory is latched at these times.

9. A circuit arrangement according to claim 4, wherein $(n-m)/k$ shift registers are provided, wherein one of the $(n-m)/k$ further bits of the global addresses passes through the individual shift registers to the second address inputs of the memory at the k times.

* * * * *